No. 819,676. PATENTED MAY 1, 1906.
J. W. SCHAUER.
GRAIN CONVEYER.
APPLICATION FILED OCT. 28, 1905.
2 SHEETS—SHEET 1.
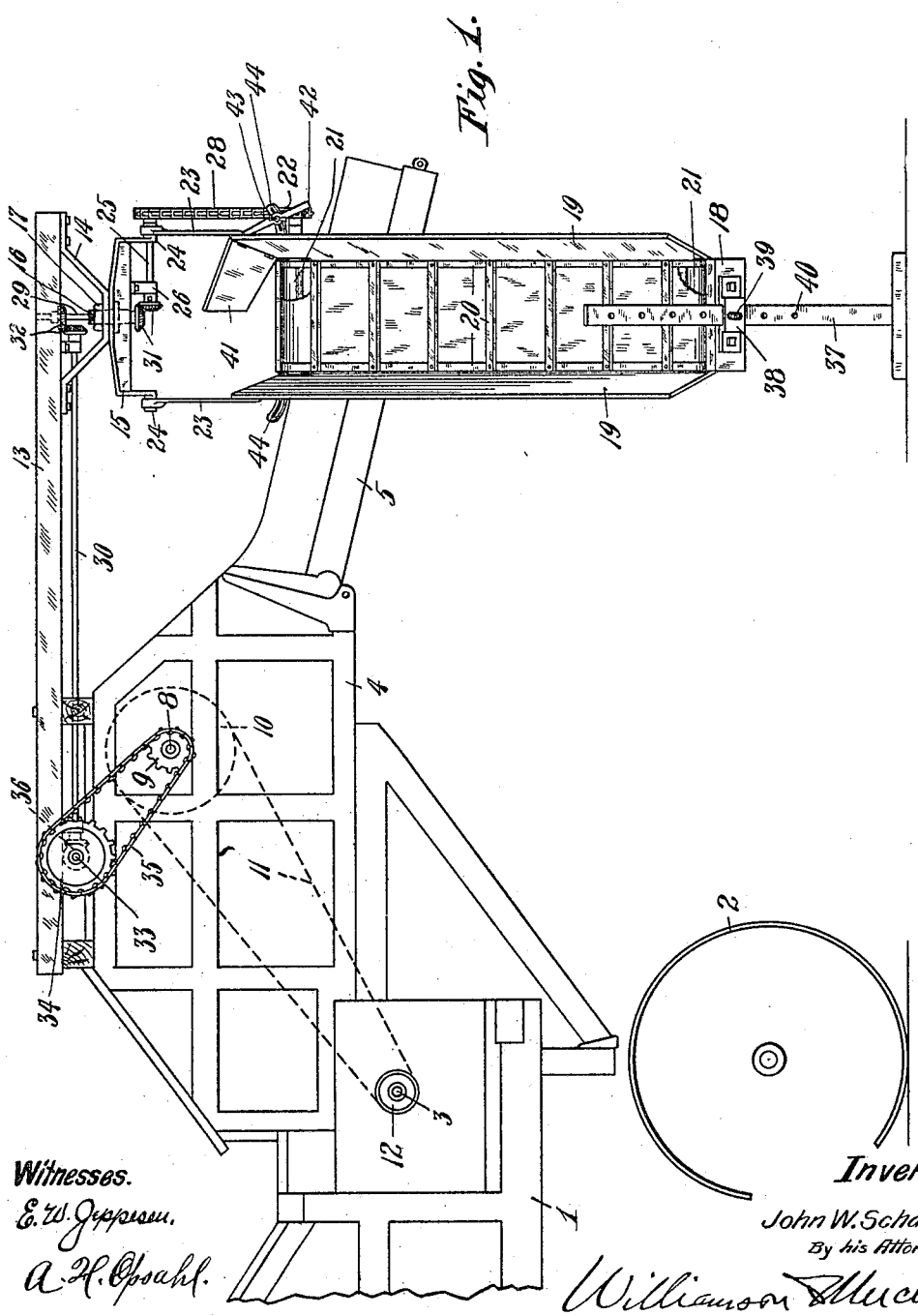
Witnesses.
E. W. Jeppesen.
A. H. Opsahl.
Inventor.
John W. Schauer.
By his Attorneys.
Williamson & Merchant

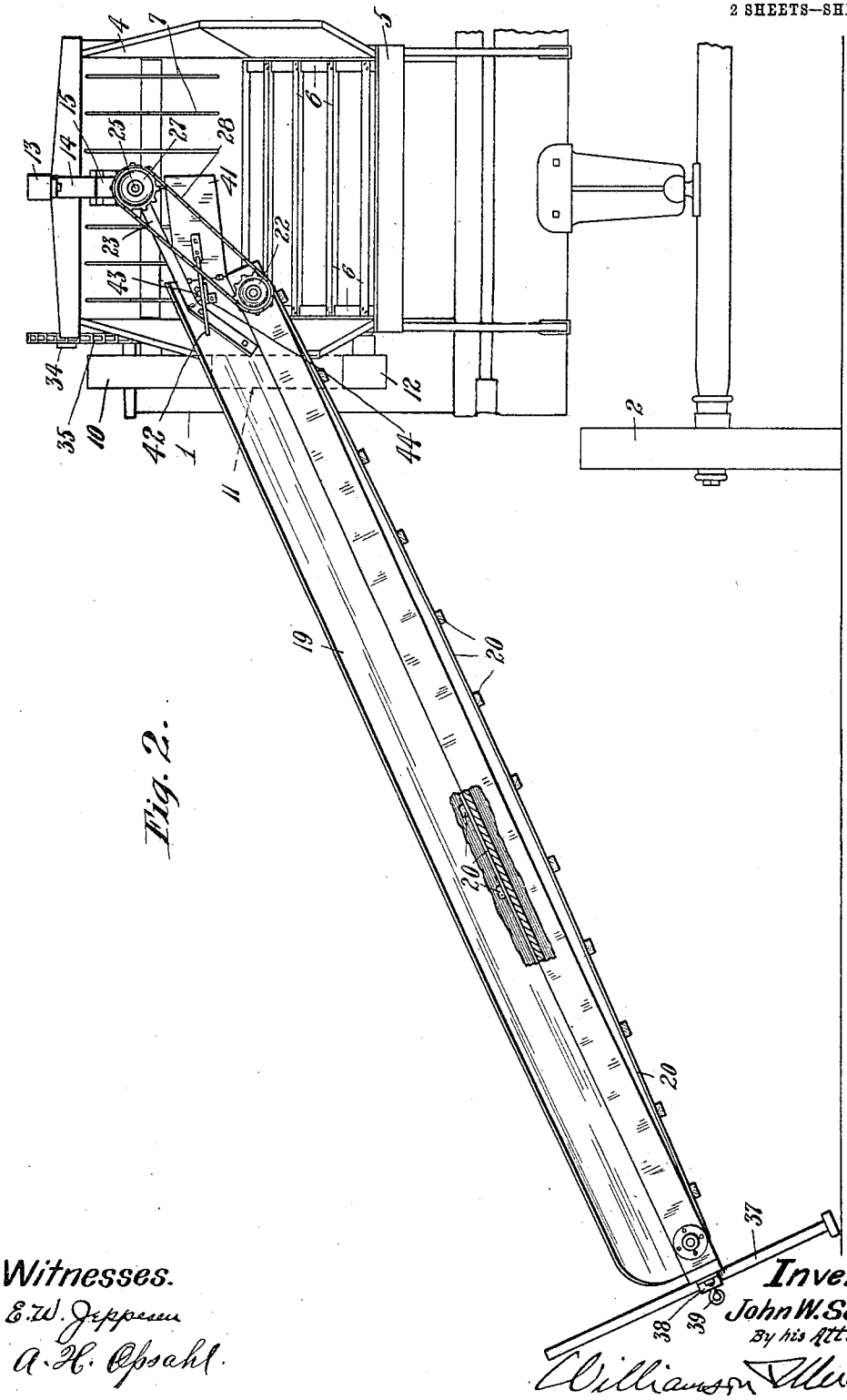

UNITED STATES PATENT OFFICE.

JOHN W. SCHAUER, OF KALISPELL, MONTANA, ASSIGNOR TO KALISPELL MANUFACTURING & IMPROVEMENT COMPANY, A CORPORATION OF MONTANA.

GRAIN-CONVEYER.

No. 819,676.     Specification of Letters Patent.     Patented May 1, 1906.

Application filed October 28, 1905. Serial No. 284,813.

*To all whom it may concern:*

Be it known that I, JOHN W. SCHAUER, a citizen of the United States, residing at Kalispell, in the county of Flathead and State of Montana, have invented certain new and useful Improvements in Grain-Conveyers; and I do hereby declare the following to be a full, clear, and exact description of the invention, such as will enable others skilled in the art to which it appertains to make and use the same.

My invention has for its object to provide a simple and efficient grain-conveyer for use in connection with threshing-machines, and especially in connection with those employing a band-cutter and feeder. To the above ends the invention consists of the novel devices and combinations of devices hereinafter described, and defined in the claims.

In the accompanying drawings, which illustrate my invention, like characters indicating like parts throughout both views, Figure 1 is a side elevation showing in diagram a portion of a threshing-machine, a band-cutter and feeder applied thereto, and my improved bundle-conveyer in front view attached to the said band-cutter and feeder, the said bundle-conveyer being indicated in full; and Fig. 2 is a front elevation of the parts shown in Fig. 1, some parts being broken away.

The numeral 1 indicates the case, the numeral 2 the front wheels, and the numeral 3 the cylinder-shaft, of a threshing-machine of standard construction.

The numeral 4 indicates the case of the band-cutter and feeder, the same, as shown, being supported from the case 1 of the threshing-machine in the usual way and having the outward extension 5, that supports the endless feed-belt 6 of the said band-cutter and feeder.

The numeral 7 indicates the band-cutter, the shaft 8 of which is suitably journaled in and projects through the sides of the case 4 and is provided with a sprocket 9 and a pulley 10, which latter is indicated by dotted lines only. A belt 11 (indicated by dotted lines) runs over a pulley 12 on the cylinder-shaft 3 and over the pulley 10 to impart motion to the said cylinder-shaft and to the band-cutter shaft 8.

Rigidly secured to the top of the case 4 and projecting forward therefrom is a supplemental frame 13, the forward end of which overlies the feed-belt 6 and rigidly supports a bearing-yoke 14, to which is swiveled an oscillatory bearing-yoke 15. As shown, the swiveled joint between the two yokes is made by a trunnion 16 on the movable yoke 15, which is passed through a seat in the yoke 14 and is provided with a nut 17.

The bundle-conveyer comprises an elongated frame 18, having side-boards 19 and an endless slat-and-belt conveyer 20, that runs over rollers 21, mounted in the ends of said frame 18. The shaft of the upper roller 21 projects and is provided with a sprocket 22. At its upper end the frame 18 is provided with metallic brackets 23, that are pivoted on trunnions 24 at the ends of the oscillatory bearing-yoke 15. A short counter-shaft 25 extends through one of the trunnions 24 and through a bearing 26 on the yoke 15. At its outer end the shaft 26 is provided with a sprocket 27, over which and the sprocket 22 runs a sprocket-chain 28. A vertical counter-shaft 29 extends through and is journaled in the trunnion 16 of the yoke 15. A long counter-shaft 30 is journaled in suitable bearings on the supplemental frame 13. A pair of miter-gears 31 connect the shafts 25 and 29, and a pair of miter-gears 32 connect the shafts 29 and 30. Mounted in suitable bearings on the case 4 is a transverse counter-shaft 33, which is provided at its outer end with a sprocket 34. A sprocket-chain 35 runs over the sprocket 34 and over the sprocket 9 of the band-cutter shaft 8. A pair of miter-gears 36 (shown only by dotted lines) connect the shafts 30 and 33.

Driving connections have now been described whereby the feed-belt 20 of the bundle-conveyer will be driven from the cylinder-shaft 23. It is also evident that without interfering with these driving connections the free outer end of the conveyer-frame 18 may be raised and lowered and oscillated horizontally at will.

To support the free end of the conveyer-frame 18 in different positions, either from the ground or from the stack, it is provided with a vertically-adjustable supporting-leg 37, that works through a keeper 38 on the end of said frame 18 and is adapted to be adjustably held by a pin 39, which is insertible through a seat in said keeper and through any one of a series of holes 40 in said leg.

The side-board 19 which is farthest away from the threshing-machine has a hinged extension or deflecting-board 41. This deflecting-board 41 is provided with a rigidly-secured arm 42, that is adapted to be adjustably secured by a thumb-screw 43 to a segment 44. This deflecting-board 41 is adapted to act upon the bundles to turn the same from positions transversely of the conveyer-belt 20 into positions transversely of the feeder-belt 6. To accomplish this, the said deflecting-board should be set in different positions when the conveyer-frame 18 is moved horizontally into different angular positions with respect to the band-cutter and feeder.

The bundle-conveyer is in the drawings shown as turned to the left-hand side of the threshing-machine; but it is adapted to be turned to the right-hand side thereof, and when it is so turned the deflecting-board 41 should either be shifted to the other side-board 19 or the said latter side-board should be provided with an adjustable deflecting-board of its own. As is evident, the bundles thrown onto the outer portion of the conveyer-belt 20 will be carried to the conveyer-belt 6 of the band-cutter and feeder, thus effecting a great saving of manual labor required to supply the bundles to the threshing-machine.

What I claim, and desire to secure by Letters Patent of the United States, is as follows:

1. The combination with a threshing-machine and a band-cutter and feeder applied thereto, of a supplemental frame 13 applied to the case of said band-cutter and feeder and provided, at its extended end, with a fixed bearing-yoke 14, a bearing-yoke 15 swiveled to said fixed yoke 14, an elongated frame 18 pivoted to the said yoke 15, an endless feed-belt mounted on said frame 18, and a drive for said feed-belt comprising gears, sprockets, sprocket-chains and shafts, one of which shafts extends through the swiveled connection between said yokes 14 and 15, and another of which shafts extends through the pivotal connection between said yoke 15 and parts rigid on said frame 18, substantially as described.

2. The combination with a threshing-machine and a band-cutter and feeder applied thereto, of a bundle-conveyer comprising an elongated frame having side-boards and supported at its inner end with freedom for vertical and lateral pivotal movements, one of said side-boards having a hinged deflecting-board forming an extension thereon overlying the feed-belt of said band-cutter and feeder, an endless feed-belt mounted on said elongated frame, and a drive for said latter feed-belt, substantially as described.

In testimony whereof I affix my signature in presence of two witnesses.

JOHN W. SCHAUER.

Witnesses:
W. H. GRIFFIN,
GEORGE F. STANNARD.